United States Patent
Motegi et al.

(10) Patent No.: US 9,259,992 B2
(45) Date of Patent: Feb. 16, 2016

(54) VEHICLE AIR CONDITIONER CONTROL SYSTEM

(75) Inventors: Yugo Motegi, Yokohama (JP); Tadashi Iwamoto, Kawasaki (JP); Takashi Watanabe, Machida (JP); Tetsuya Fuke, Ebina (JP); Tetsuya Furumaya, Sagamihara (JP)

(73) Assignee: Nissan Motor Co., Ltd., Kanagawa (JP)

(*) Notice: Subject to any disclaimer, the term of this patent is extended or adjusted under 35 U.S.C. 154(b) by 488 days.

(21) Appl. No.: 13/523,529

(22) Filed: Jun. 14, 2012

(65) Prior Publication Data

US 2012/0318015 A1 Dec. 20, 2012

(30) Foreign Application Priority Data

Jun. 14, 2011 (JP) ................................. 2011-131838

(51) Int. Cl.
*B60H 1/32* (2006.01)

(52) U.S. Cl.
CPC ...... *B60H 1/3208* (2013.01); *B60H 2001/3266* (2013.01); *B60H 2001/3272* (2013.01); *B60H 2001/3275* (2013.01)

(58) Field of Classification Search
CPC .............. B60H 1/3208; B60H 2001/3266; B60H 2001/3272; B60H 2100/3275; B60H 1/00764; F25B 47/006; F25B 49/022; F25B 2600/02; F25D 21/04; F02D 41/123
USPC ......................... 62/133, 150, 228.1
See application file for complete search history.

(56) References Cited

U.S. PATENT DOCUMENTS 4,485,635 A * 12/1984 Sakano ............................ 62/209
5,271,368 A * 12/1993 Fujii et al. ...................... 123/493

(Continued)

FOREIGN PATENT DOCUMENTS

| CN | 1831335 A | 9/2006 |
| CN | 102059932 A | 5/2011 |

(Continued)

OTHER PUBLICATIONS

Chinese Office Action for Application No. 201210069456.4, mailed on May 13, 2014 (5 pages).

(Continued)

*Primary Examiner* — Frantz Jules
*Assistant Examiner* — Jose O Class-Quinones
(74) *Attorney, Agent, or Firm* — Osha Liang LLP

(57) ABSTRACT

A vehicle air conditioner control system has an air conditioning device has a compressor, a condenser, an expansion valve, and an evaporator, a compressor running rate control device, a deceleration fuel cutoff executing device, and a fuel supply recovery executing device that cancels cutoff of fuel supply and recovers fuel supply at a higher vehicle speed during vehicle deceleration fuel cutoff period with air-conditioner ON than during vehicle deceleration fuel cutoff period with air-conditioner OFF. The compressor running rate control device increases the compressor running rate for a predetermined period just before a fuel supply recovery time with air-condition ON during the deceleration fuel cutoff period more than during non-execution of the deceleration fuel cutoff, and subsequently decreases the compressor running rate at or just before the fuel supply recovery time with air-condition ON equal to or less than during non-practice of the deceleration fuel cutoff.

8 Claims, 5 Drawing Sheets

(56) References Cited

U.S. PATENT DOCUMENTS

| | | | |
|---|---|---|---|
| 6,691,522 B1 * | 2/2004 | Kojima | 62/133 |
| 6,694,751 B2 * | 2/2004 | Wakisaka et al. | 62/133 |
| 6,973,798 B2 * | 12/2005 | Ikura et al. | 62/228.5 |
| 7,100,383 B2 * | 9/2006 | Sugesawa et al. | 62/133 |
| 2002/0069656 A1 | 6/2002 | Niimi | |
| 2003/0033068 A1 | 2/2003 | Kawai et al. | |
| 2003/0051495 A1 * | 3/2003 | Ohta et al. | 62/229 |
| 2003/0131612 A1 * | 7/2003 | Wakisaka et al. | 62/133 |
| 2003/0192326 A1 * | 10/2003 | Masuda et al. | 62/133 |
| 2007/0256436 A1 * | 11/2007 | Hayashi | 62/161 |
| 2007/0277545 A1 * | 12/2007 | Engel | 62/230 |
| 2008/0022704 A1 * | 1/2008 | Fukuta | 62/172 |
| 2010/0036590 A1 * | 2/2010 | Nakai | 701/112 |

FOREIGN PATENT DOCUMENTS

| | | |
|---|---|---|
| EP | 1600618 A2 | 11/2005 |
| JP | H07-34929 A | 2/1995 |
| JP | H08-188044 A | 7/1996 |
| JP | 2002234340 A | 8/2002 |
| JP | 2005119386 A | 5/2005 |
| JP | 2009154627 A | 7/2009 |
| JP | 4399989 B | 11/2009 |

OTHER PUBLICATIONS

Extended European Search Report issued in EP Application No. 12161160.2, mailed Oct. 9, 2012 (5 pages).

Office Action in corresponding Japanese application No. 2011-131838, dated Nov. 4, 2014 (3 pages).

\* cited by examiner

VEHICLE AIR CONDITIONER CONTROL SYSTEM

BACKGROUND OF THE DISCLOSURE

1. Field of the Disclosure

The present disclosure relates to control a vehicle air-conditioner, particularly during vehicle deceleration fuel cutoff.

2. Description of the Related Art

Recently, there have been proposed and developed various fuel cutoff systems which are designed to reduce exhaust emissions and fuel consumption by cutting fuel supply to the engine cylinder or cylinders through the fuel cutoff control. The fuel cutoff control is frequently performed under certain required engine/vehicle operating conditions, such as during vehicle deceleration, coasting, or down-hill operations. Deceleration fuel cutoff is defined as the fuel cutoff control during deceleration of the vehicle.

On the other hand, many cars are equipped with automatic transmissions with lock-up torque converters which act to mechanically couple the engine crankshaft to the transmission output shaft. When a lock-up device incorporated in the lock-up torque converter assumes its converter state (corresponding to a lock-up clutch release position), the engine crankshaft and the transmission output shaft are coupled via fluid in the torque converter in normal operation. On the contrary, when the lock-up device assumes its locked-up state (corresponding to a lock-up clutch engagement position), the engine crankshaft and the transmission output shaft are directly coupled to each other by a mechanical connection (via engagement the lock-up clutch), thus disabling or locking up the torque converter. The converter state will be hereinafter referred to as "lock-up OFF state," while the locked-up state will be hereinafter referred to as "lock-up ON state."

The control technique of an air-conditioner compressor which is subject to running rate is described in Patent Document 1. The running rate of the compressor is increased from the rate of the lock-up OFF state when the lock-up ON state is starting. The increasing of the running rate is finished when a predetermined time Tup has passed from the start of lock-up ON state. The running rate is then decreased to the rate of the lock-up OFF state.

[Patent Document 1]
Japanese Patent No. 4399989

SUMMARY OF THE CLAIMED SUBJECT MATTER

According to one or more embodiments of the present disclosure, a vehicle air conditioner control system comprises an air conditioning device that performs a refrigerating cycle and comprising a compressor that intakes, compresses, and discharges a refrigerant, a condenser that condenses the refrigerant discharged from the compressor, an expansion valve that depressurizes the refrigerant condensed by the condenser, and an evaporator that performs heat exchange between open air and the refrigerant to vaporize the refrigerant, a compressor running rate control device that controls a running rate of the compressor, a deceleration fuel cutoff executing device that performs cutoff of fuel supply during vehicle deceleration, and a fuel supply recovery executing device that cancels cutoff of fuel supply and recovers fuel supply at a higher vehicle speed during vehicle deceleration fuel cutoff period with air-conditioner ON than during vehicle deceleration fuel cutoff period with air-conditioner OFF. The compressor running rate control device increases the compressor running rate for a predetermined period just before a fuel supply recovery time with air-condition ON during the deceleration fuel cutoff period more than during non-execution of the deceleration fuel cutoff, and subsequently decreases the compressor running rate at or just before the fuel supply recovery time with air-condition ON equal to or less than during non-practice of the deceleration fuel cutoff.

According to one or more embodiments of the present disclosure, the predetermined period is set to prevent the evaporator from freezing.

According to one or more embodiments of the present disclosure, the compressor running rate control device increases the compressor running rate for the predetermined period more than during non-practice of the deceleration fuel cutoff only when a temperature of the evaporator is above a predetermined lower limit value.

According to one or more embodiments of the present disclosure, the compressor running rate control device decreases the compressor running rate at or just before the fuel supply recovery time with air-condition ON only when a temperature of the evaporator is below a predetermined upper limit value.

According to one or more embodiments of the present disclosure, a vehicle air conditioner control system comprises an air conditioning device that performs a refrigerating cycle and comprising a compressor that intakes, compresses, and discharges a refrigerant, a condenser that condenses the refrigerant discharged from the compressor, an expansion valve that depressurizes the refrigerant condensed by the condenser, and an evaporator that performs heat exchange between open air and the refrigerant to vaporize the refrigerant, a compressor running rate control means for controlling a running rate of the compressor, a deceleration fuel cutoff executing means for performing cutoff of fuel supply during vehicle deceleration, and a fuel supply recovery executing means for canceling cutoff of fuel supply and recovering fuel supply at a higher vehicle speed during vehicle deceleration fuel cutoff period with air-conditioner ON than during vehicle deceleration fuel cutoff period with air-conditioner OFF. The compressor running rate control means increases the compressor running rate for a predetermined period just before a fuel supply recovery time with air-condition ON during the deceleration fuel cutoff period more than during non-execution of the deceleration fuel cutoff, and subsequently decreases the compressor running rate at or just before the fuel supply recovery time with air-condition ON equal to or less than during non-practice of the deceleration fuel cutoff.

According to one or more embodiments of the present disclosure, the predetermined period is set to prevent the evaporator from freezing at or just before the fuel supply recovery time.

According to one or more embodiments of the present disclosure, the compressor running rate control means increases the compressor running rate for the predetermined period more than during non-practice of the deceleration fuel cutoff only when a temperature of the evaporator is above a predetermined lower limit value.

According to one or more embodiments of the present disclosure, the compressor running rate control means decreases the compressor running rate at or just before the fuel supply recovery time with air-condition ON only when a temperature of the evaporator is below a predetermined upper limit value.

DETAILED DESCRIPTION

Figure 1:
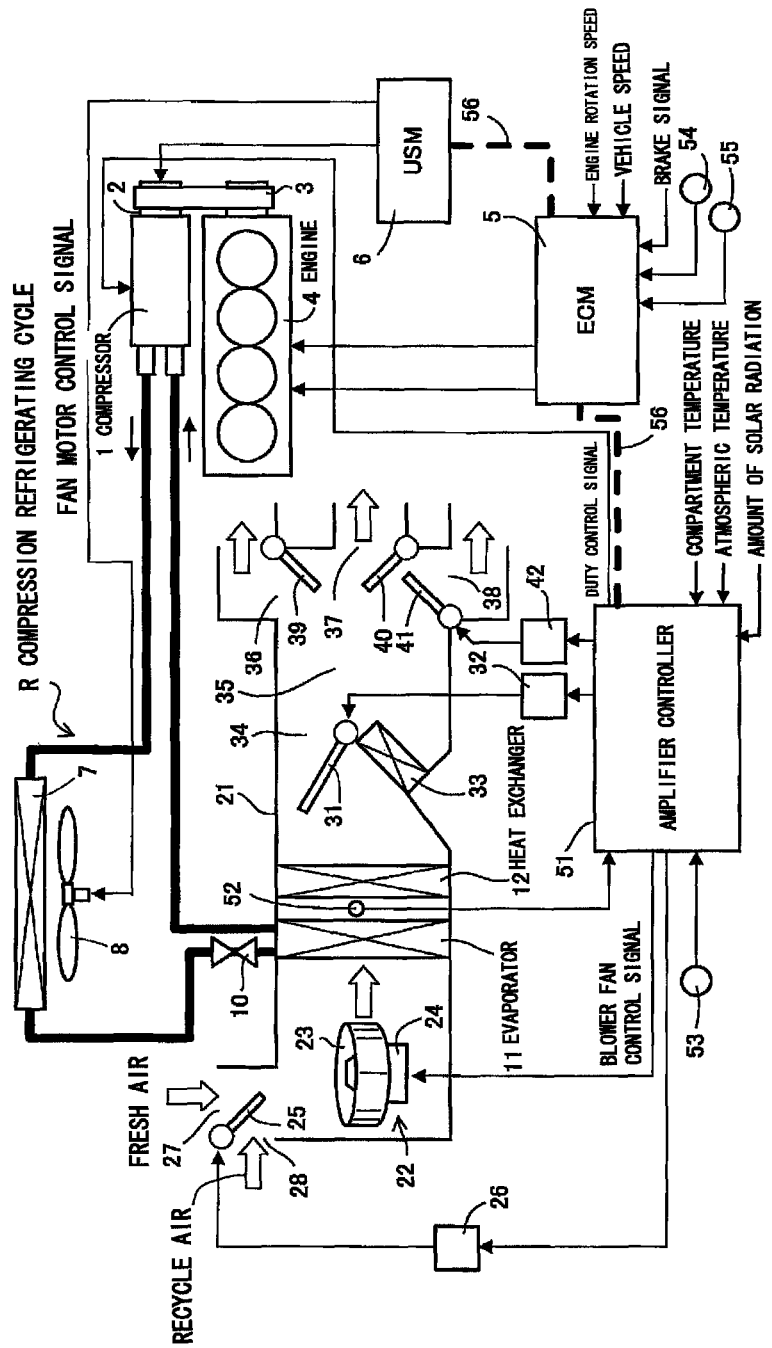
FIG. 1 shows a schematic system diagram of the vehicle air conditioner according to a first embodiment of the present disclosure.

Hereinafter, examples of the present disclosure will be described in detail with reference to embodiments shown in the drawings. In embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid obscuring the disclosure.

In patent document 1, the predetermined time Tup affects the evaporator cooling power. Sometimes the evaporator cooling power is insufficient when the air conditioner is ON when the lock-up is released, while sometimes the cooling power is superabundant when the air conditioner is OFF at when the lock-up is released.

Patent document 1 pays its attention to the vehicle speed at which lock-up state changes from ON to OFF, but the concept may be equally applicable to adjustments of a timing of fuel supply recovery.

In one or more embodiments of the present disclosure, the evaporator cooling power is adequately kept at a vehicle speed for fuel supply recovery whether the air-conditioner is ON or OFF at fuel supply recovery.

A vehicle air conditioner according to one or more embodiments of the present disclosure comprises a compression refrigerating cycle R including a compressor that intakes, compresses and discharges refrigerant, a condenser that condenses a high temperature and high pressure refrigerant discharged from the compressor, an expansion valve 10 that depressurizes the refrigerant which is condensed by the condenser, an expansion valve 10 that decreases pressure of the refrigerant to low pressure, and an evaporator that performs heat exchange between open air and the refrigerant, and vaporizing the refrigerant.

According to one or more embodiments of the present disclosure, the vehicle air conditioner comprises a compressor running rate control means that controls the running rate of compressor, a deceleration fuel cutoff executing means that performs cutoff of the fuel supply during vehicle deceleration, and a fuel supply recovery executing means that cancels the fuel cutoff and recover fuel supply. The fuel supply recovery executing means cancels the fuel cutoff and recover fuel supply at a higher vehicle speed with the deceleration fuel cutoff and air-conditioner ON than the deceleration fuel cutoff and air-conditioner OFF. The compressor running rate control means increases the compressor running rate in the predetermined period just before fuel supply recovery time in air-condition ON during the deceleration fuel cutoff more than that during non-practice or non-execution of the deceleration fuel cutoff and decreases the compressor running rate at or just before the fuel supply recovery time in air-condition ON less than that during non-practice of the deceleration fuel cutoff.

According to one or more embodiments of the current disclosure, regardless of the start time of the deceleration fuel cutoff, a cooling power shortage of the evaporator is prevented before the fuel supply recovery time while the compressor is ON. As a result, the shortage of the air conditioning capability in the vehicle compartment due to fall of the running rate of the compressor can be prevented. Also, the evaporator can be prevented from being frozen up by an excessive running rate of the compressor.

As shown in FIG. 1, a compression refrigerating cycle of vehicle air conditioner R includes compressor 1, condenser 7, expansion valve 10, and evaporator 11. Compressor 1 has electromagnetic clutch 2 for intermittent power supply and intakes, compresses, and discharges a refrigerant. The power of engine 4 is transmitted to compressor 1 through electromagnetic clutch 2 and belt 3, and the running of compressor 1 is intermitted by intermitting electrification to electromagnetic clutch 2 by engine control module 5 and under switching module 6.

The gaseous refrigerant at high temperature and the high pressure is discharged from compressor 1 and then flows into condenser 7. The refrigerant is cooled by heat exchange with outer air sent by cooling fan 8, and condenses. The refrigerant which is condensed by condenser 7 is depressurized by expansion valve 10 to a low pressure, and becomes two aspect states of the liquid and gas at the low pressure. The low pressure refrigerant from expansion valve 10 flows into evaporator 11.

Evaporator 11 is installed in air conditioning case 21 of the vehicle air conditioner. The low pressure refrigerant that flows into evaporator 11 cools the air in air conditioning case 21, which in turn heats and evaporates the refrigerant. The exit of evaporator 11 is coupled to the intake of compressor 1. In this manner, the compression refrigerating cycle R forms a closed circuit.

In air conditioning case 21, blower 22 is arranged upstream of evaporator 11. Blower 22 comprises blower fan 23 and driving motor 24. On the intake side of blower fan 23, fresh air inlet port 27 and recycle air inlet port 28 are opened and closed by air selecting door 25. Fresh air (i.e., air from outside of car compartment) or recycled air (i.e. air from inside car compartment) is selected by air selecting door 25. The air selecting door 25 is driven by electric drive device 26 comprising servomotors.

Heat exchanger 12 (to be described below) and air mixture door 31 are sequentially arranged downstream of evaporator 11. Heater core (heat exchanger for heating) 33 is installed downstream of air mixture door 31 and heats air with warm water (coolant) heated by engine 4. Bypass passages 34 disposed beside (the upper portion in FIG. 1) the heater core 33 carries away air (a cold wind) that bypasses heater core 33.

Air mixture door 31 is a pivotable board-shaped door, and is driven by electric drive device 32 comprising servomotors. Air mixture door 31 regulates a quantity of wind ratio of the warm air passing heater core 33 and a cold air passing bypass passages 34, and air temperature to a compartment is regulated by the adjustment of the quantity of wind ratio.

Air mixture area 35 is installed downstream of heater core 33. Warm air from warm heater core 33 and cold air from bypass passages 34 mix in the air mixture area 35, and air of predetermined temperature is thereby formed.

Defroster aperture 36, face aperture 37, and foot aperture 38 are formed downstream of air mixture area 35. Each aperture is opened or closed by defroster door 39, face door 40, and foot door 41, each of which is a pivotable board. Three doors 39, 40, and 41, are coupled by common linkage, and are driven by electric drive device 42 comprising servomotors through this linkage. For example, when defroster door 39 opens, air blows out to windshield inside through defroster duct (not illustrated), when face aperture 37 opens, air begins to blow to an upper part of a passenger's body in the compartment through the face duct (not illustrated), and when foot aperture 38 opens, air blows out through the foot duct (not illustrated) to the feet of the passenger in the compartment.

Evaporator temperature (evaporator blow-out temperature) from temperature sensor 52 and an air-conditioner input signal from air-conditioner switch 53 are input into amplifier controller 51 (a compressor running rate control means). When air-conditioner switch 53 is in an ON state, the control amplifier 51 outputs a duty signal to the compressor 1 controlling the compressor running rate so that real evaporator temperature detected by temperature sensor 52 is adjusted to a target temperature of evaporator 11.

When air-conditioner switch 53 is turned on, amplifier controller 51 transmits a signal to operate compressor 1 to engine control module 5 by CAN communication 56. Control amplifier 51 controls blower fan driving motor 24 so that a target quantity of air flow is provided and controls electric drive device 26, 32 and 42 for the automatic control of outlet air and inlet air.

Engine control module 5 controls a quantity of fuel injection to engine 4, fuel injector timing, and the ignition time, based on the signal from various sensors detecting a driving state of engine 4.

Refrigerant pressure from refrigerant pressure sensor 54 and an accelerator opening ratio from accelerator sensor 55 are input into engine control module 5. When it is judged that engine control module 5 can operate compressor 1 by these signals, a compressor ON signal is transmitted to under switching module 6 by CAN communication 56. After receiving a compressor ON signal from engine control module 5, switching module 6 turns on an air-conditioner relay in module 6 and operates compressor 1 by connecting electromagnetic clutch 2.

Engine control module 5 (a deceleration fuel cutoff executing means) performs a fuel cutoff at the time of the slowdown of the vehicle for mileage improvement. Furthermore, engine control module 5 (a fuel supply recovery executing means) cancels fuel cutoff and recovers fuel supply at a vehicle speed in the condition of the deceleration fuel cutoff and air-conditioner ON higher than the vehicle speed at which engine control module does in the condition of the deceleration fuel cutoff and air-conditioner OFF. Here, the condition of air-conditioner ON is defined as air-conditioner switch 53 being in an ON state (in other words, running demand time of compressor 1), and the condition of air-conditioner OFF is defined as air-conditioner switch 53 being in an OFF state (in other words, running non-demand time of compressor 1).

Heat exchanger 12 is disposed immediately downstream of evaporator 11. As shown in FIG. 1, Because the shape of heat exchanger 12 is same in front area as the evaporator 11, the gross volume of cold wind (a gross volume of the wind in air conditioning case 21) passes heat exchanger 12 after evaporator 11. Thus, heat exchanger 12 can be of a small thin structure of depth dimensions to an air flow direction in air conditioning case 21.

For example, heat exchanger 12 according to one or more embodiments of the present disclosure has a tubular member made of metal such as the aluminum, which has superior heat conductance, and refrigerant is sealed up inside the tubular member. According to one or more embodiments of the present disclosure, a plurality of tubular members are disposed with gaps therebetween, and air passes the gap between the plurality of tubular members. However, heat exchanger 12 is not limited to the above.

In an aforementioned conventional device, compressor running rate is increased from start time of the lock-up clutch engagement at vehicle slowdown time, and the increase is terminated upon elapse of a predetermined time Tup after the start of the lock-up clutch engagement, at which time decrease of the compressor running rate is started. The conventional device thus extends fuel cutoff time by decreasing vehicle speed for lock-up clutch release from vehicle speed for lock-up clutch release with in the air-conditioner ON to vehicle speed for lock-up clutch release with the air-conditioner OFF.

In the conventional device, evaporator cooling power may be insufficient or superabundant depending on whether the vehicle is at speed for lock-up clutch release with the air-conditioner ON or OFF, due to how the predetermined time Tup is set.

Patent document 1 pays its attention to the vehicle speed of lock-up clutch release, but according to one or more embodiments of the present disclosure, this is applied to the vehicle speed of fuel supply recovery. While the vehicle is in vehicle speed of fuel supply recovery, sometimes the evaporator cooling power is inadequate when the vehicle speed is between the vehicle speed of fuel supply recovery in the air-conditioner ON and the vehicle speed of fuel supply recovery in the air-conditioner OFF, and sometimes the evaporator cooling power is superabundant in the same setting.

Figure 2:
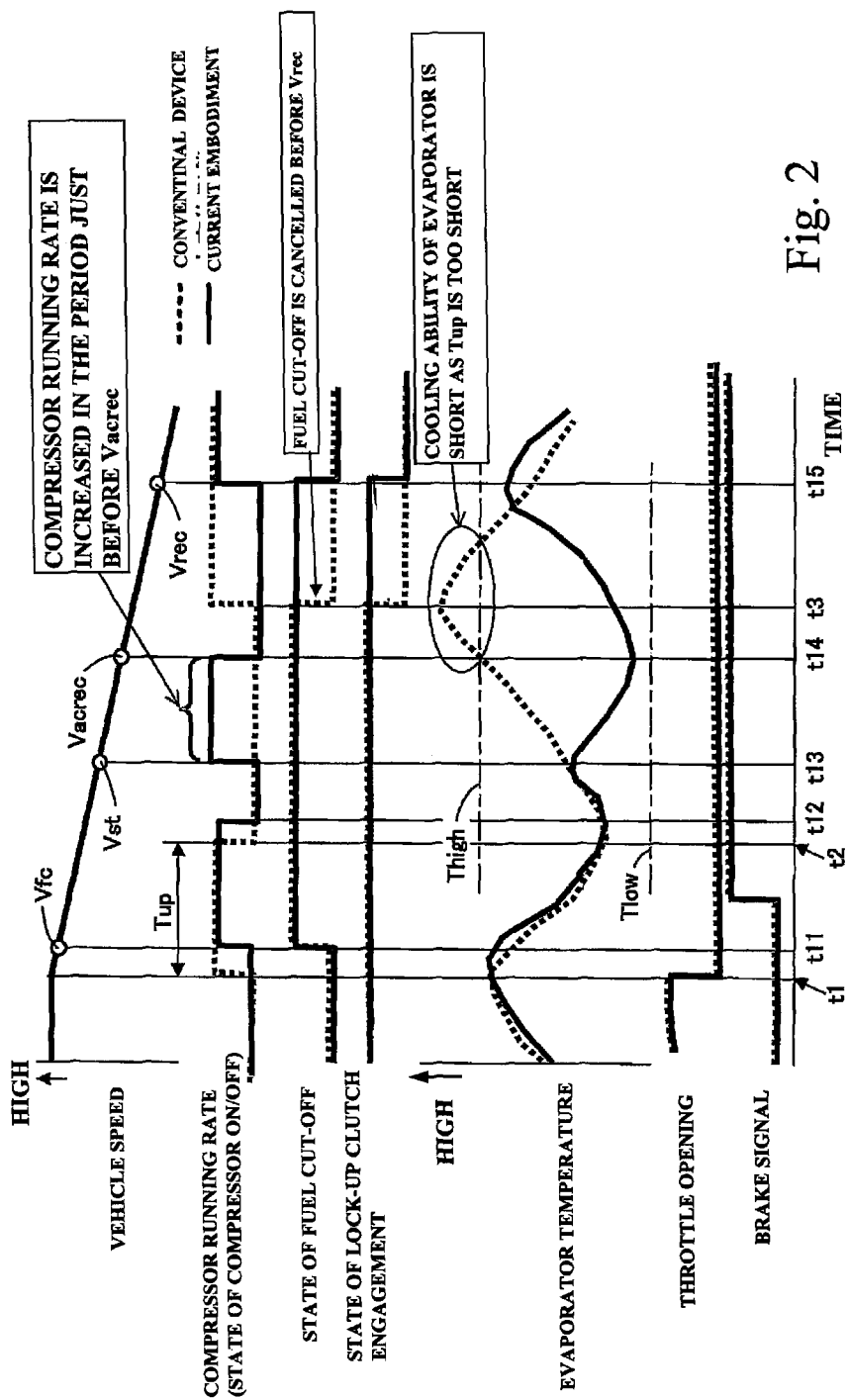
FIG. 2 shows timing charts showing each change such as vehicle speed in deceleration fuel cutoff, the compressor running rate, the evaporator temperature, etc.
Figure 3:
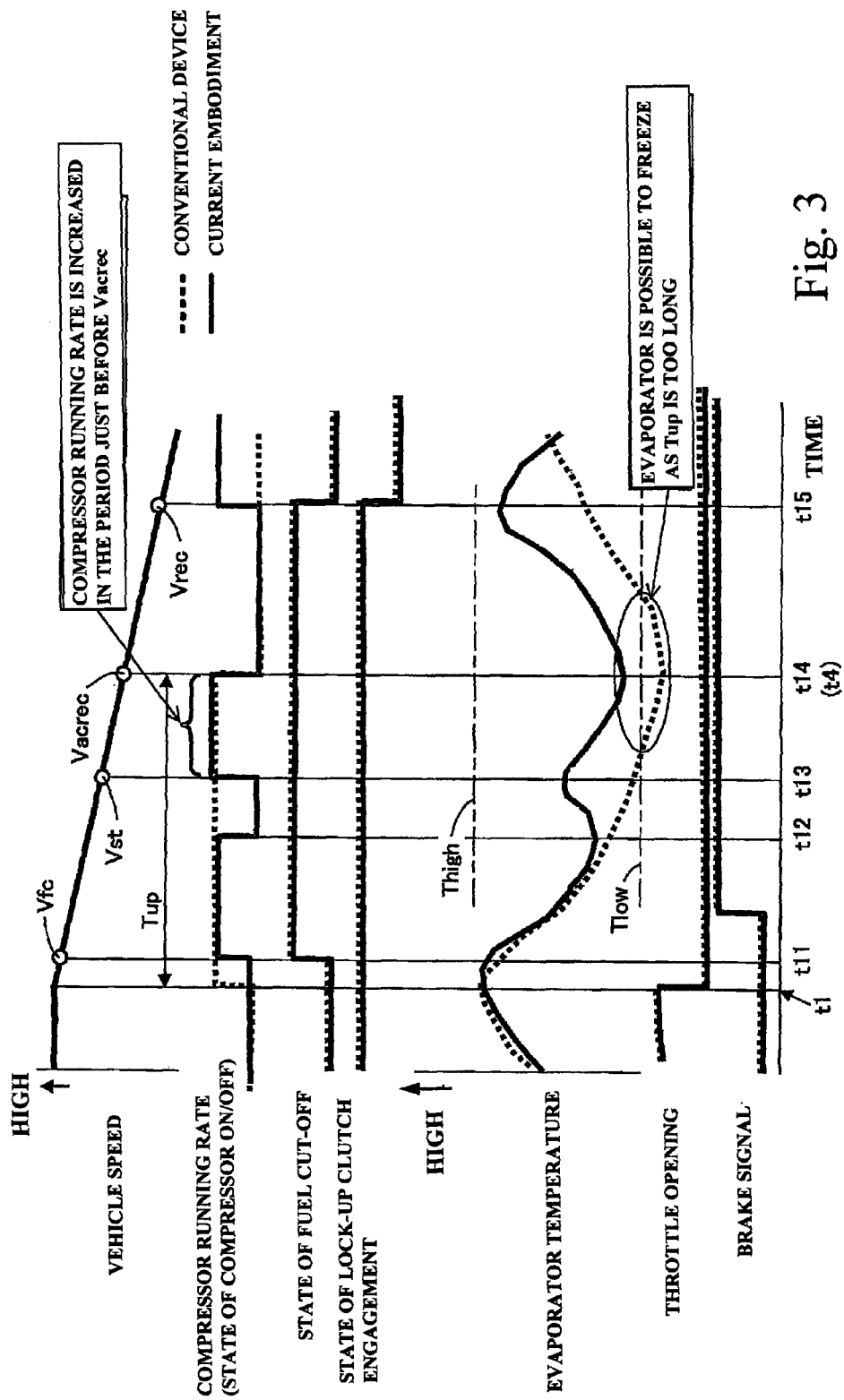
FIG. 3 shows timing charts showing each change such as vehicle speed in deceleration fuel cutoff, the compressor running rate, the evaporator temperature, etc.

This is explained in more detail by referring to FIGS. 2 and 3. The timing charts of FIGS. 2 and 3 show how vehicle speed, the compressor running rate, and evaporator temperature change during deceleration fuel cutoff. Changes to these parameters according to one or more embodiments of the present disclosure are shown by solid lines, and changes to these parameters in a conventional device is shown by broken lines. Specifically, FIG. 2 shows a case in which the predetermined time Tup is set relatively short in a conventional device, and FIG. 3 shows a case in which the predetermined time Tup is set relative long.

Note that the conventional device is directed to air conditioner control during "the slowdown time lock-up ON state," while one or more embodiments of the present disclosure contemplates "the deceleration fuel cutoff" as including "the slowdown time lock-up ON state." "The slowdown time with lock-up ON-state" of the conventional device can be replaced or interchangeable with "the deceleration fuel cutoff" in one or more embodiments of the present disclosure.

As shown in FIG. 2, when slowdown is started at time t1 by high vehicle speed (for example, 100 km/h), the vehicle speed decreases linearly. In this case, the conventional device increases the compressor running rate more than in the case of non-fuel cutoff during the predetermined time Tup from time t1, which is the slowdown start time, and decreases the compressor running rate less than in the case of non-fuel cutoff immediately after the increase period is finished. The predetermined time Tup determines a period in which the compressor running rate is increased. When the predetermined time Tup is set as a relatively short time from t1 to t2, a fall of the compressor running rate is started at time t2 that vehicle speed is not decelerated enough to vehicle speed for fuel supply recovery in the air-conditioner ON (Vacrec) state. Thus, when a vehicle is decelerated to Vacrec, evaporator temperature rises (in other words, cooling power of evaporator 11 deteriorates), and effectiveness of the air conditioning in the compartment turns worse with the fall of the compressor running rate.

For example, the compressor running rate is increased more than in non-practice of the fuel cutoff by time t3 to deal with reduction of the effectiveness of the air conditioning in the compartment (a fuel cutoff is finished, and compressor 1 is driven by engine 4). However, a fuel cutoff will be terminated just before the time of Vrec and improvement of fuel efficiency is not available.

In FIG. 3, predetermined time Tup, which is a period for compressor running rate increase in a conventional device, is set relatively long from t1 to t4, wherein t4 is the time at which the vehicle speed is Vacrec. As shown in FIG. 3, in the conventional device, the evaporator temperature falls too far (cold power of evaporator 11 becomes excessive) in direct proportion to long predetermined time Tup. Furthermore, in the conventional device with a long Tup, the evaporator 11 may freeze.

Thus, in a first embodiment of the present disclosure, the compressor running rate is increased more than in non-practice of the fuel cutoff during a predetermined period just before the vehicle speed reaches Vacrec, which is vehicle speed for fuel supply recovery at air-conditioner ON time (compressor running demand time) in deceleration fuel cutoff. Additionally, the compressor running rate is decreased less than in the non-practice of the fuel cutoff when the vehicle speed reaches Vacrec.

Figure 4:
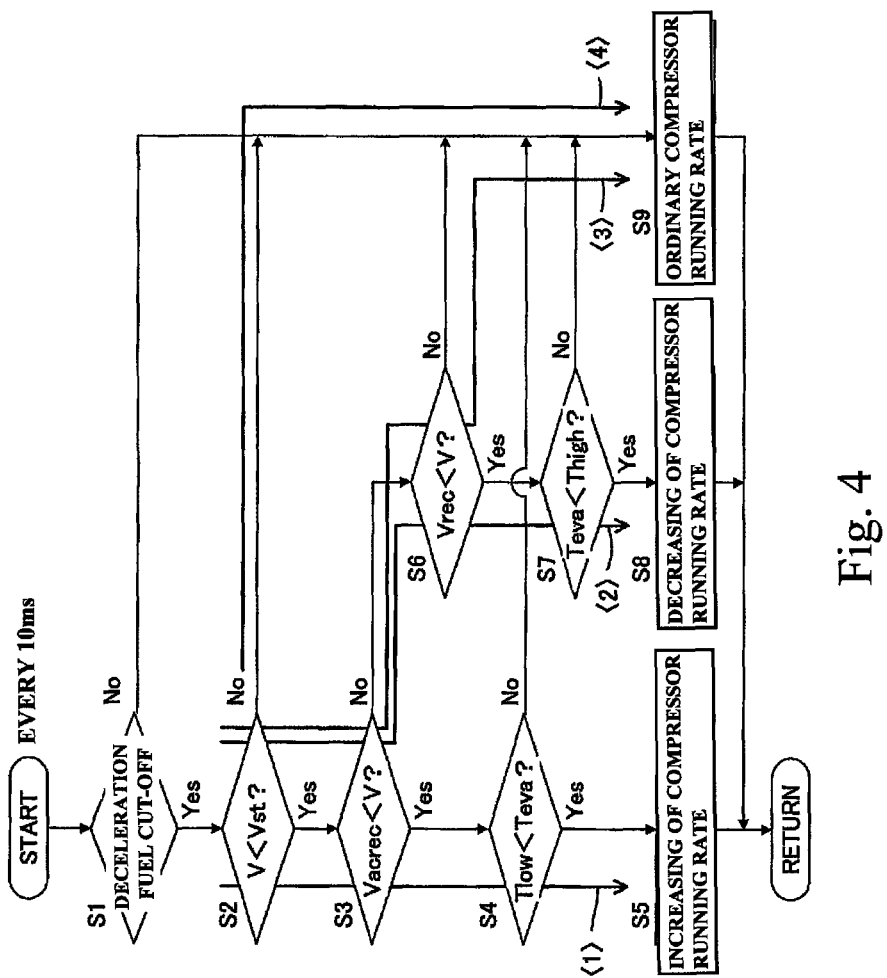
FIG. 4 shows a flow chart explaining the control of compressor running rate during deceleration fuel cutoff.

With reference to the flow chart shown in FIG. 4, compressor running rate control in this deceleration fuel cutoff performed by control amplifier 51 (a compressor running rate control means) according to one or more embodiments of the present disclosure is explained in detail. The process in FIG. 4 is carried out once every predetermined time (for example, every 10 ms).

First, it is evaluated in step S1 whether deceleration fuel cutoff is being done or executed. For example, if throttle valve open angle is zero (with an accelerator pedal returned) and vehicle speed is beyond vehicle speed for starting fuel cutoff Vfc, a fuel cutoff authorization condition is formed or issued and fuel cutoff flag is set to "1". In the case of the fuel cutoff flag=1, engine control module 5 performs a fuel cutoff. Thus, when fuel cutoff flag=1, it is judged to be in deceleration fuel cutoff, and the process advances to step S2, S3 or S6. Step S2, S3 and S6 are divided into 4 ranges depending on the vehicle speed: (1) Vacrec<V<Vst; (2) Vrec<V≤Vacrec; (3) V≤Vrec; and (4) V≥Vst. Here, "V" is vehicle speed detected by a vehicle speed sensor, "Vst" is vehicle speed for starting increase of compressor running rate, "Vacrec" is vehicle speed for fuel supply recovery in the air-conditioner ON state, and "Vrec" is vehicle speed for fuel supply recovery in the air-conditioner OFF state. The relationship among these three vehicle speeds may be expressed as Vst>Vacrec>Vrec.

When V falls under (1), control advances to step S5 via steps S2 and S3, and the compressor running rate is increased more than in the non-practice of the fuel cutoff. This provides a vehicle speed condition for starting increase of compressor running rate Vst, and a period to increase the compressor running rate is decided at the vehicle speed range of Vacrec<V<Vst. This is described later with reference to step S4.

According to one or more embodiments of the present disclosure, vehicle speed Vst for starting increase of compressor running rate is set as follows. Cooling power of evaporator 11 becomes stronger as Vst is set earlier. Conversely, cooling power of evaporator 11 weakens when Vst is set later. Thus, according to one or more embodiments of the present disclosure, Vst is set to the vehicle speed at which cooling power of evaporator maintains air conditioning performance while the vehicle speed reaches Vrec when the compressor running rate was decreased less than in non-practice of the fuel cutoff in the vehicle speed range of V≤Vacrec, and at which evaporator 11 does not freeze. For example, in one or more embodiments of the present disclosure, Vst approximately 10 km/h greater than Vacrec.

However, even when the vehicle is within the predetermined time period (i.e. vehicle speed V is in the range (1) Vacrec<V<Vst), there is a possibility that evaporator temperature falls too far, and evaporator 11 freezes, if the compressor running rate is increased when the temperature is less than evaporator lower limit temperature Tlow. Thus, the compressor running rate is not increased when the evaporator 11 temperature is less than evaporator lower limit temperature Tlow. Thus, evaporator temperature Teva detected by temperature sensor 52 is compared to evaporator lower limit temperature Tlow in step S4 before advancing to step S5, and the process only advances to step S5 when evaporator temperature Teva exceeds evaporator lower limit temperature Tlow. The process advances from step S4 to step S9 if evaporator temperature Teva is less than evaporator lower limit temperature Tlow.

If the vehicle speed is in range (2), the process advances to step S8 through steps S2, S3, and S6, and the compressor running rate is decreased equal to or less than in the non-practice of the fuel cutoff. Thus, during the period in which the vehicle speed V is within the range Vrec<V≤Vacrec, the compressor running rate will be reduced. Step S7 is described below.

However, there is a possibility that evaporator temperature rises too far, and evaporator cooling power becomes inadequate, if the compressor running rate is decreased while the evaporator 11 temperature is greater than evaporator higher limit temperature Thigh, even during the vehicle running rate decreasing period (i.e., vehicle speed V is in the range Vrec<V≤Vacrec). Thus, the compressor running rate is not decreased when the evaporator 11 temperature is greater than evaporator higher limit temperature Thigh. Therefore, evaporator temperature Teva detected by temperature sensor 52 is compared to evaporator higher limit temperature Thigh in step S7 before advancing to step S8, and the process only advances to step S8 when evaporator temperature Teva is less than evaporator higher limit temperature Thigh. The process advances from step S7 to step S9 if evaporator temperature Teva is greater than evaporator higher limit temperature Thigh.

If the vehicle speed is in range (3), the process advances to step S9 through step S2, S3, and S6. If the vehicle speed is in range (4), the process advances to step S9 via step S2. In step S9, the compressor running rate is controlled to have the same value as during non-practice of the fuel cutoff (normal running time).

Next, operation according to one or more embodiments of the present disclosure is explained with reference to FIG. 2 and FIG. 3. As explained above, one or more embodiments of the present disclosure is indicated by solid lines.

First, timing charts according to one or more embodiments of the present disclosure is explained with reference to FIG. 2. In the vehicle speed range from the vehicle speed for deceleration fuel cutoff Vfc to vehicle speed for starting increase of compressor running rate Vst, the compressor running rate is controlled the same as in non-practice of the fuel cutoff. Thus, the compressor running rate is increased more than that in non-practice of the fuel cutoff from t11 to t12, and evaporator temperature falls in the period from t11 to t12.

Evaporator temperature Teva rises after time t12 when increase of the compressor running rate is finished (see solid line in the fifth timing chart in FIG. 2). However, vehicle speed reaches vehicle speed for starting increase of compressor running rate Vst by time t13 immediately after t12. In the vehicle speed area from Vst to Vacrec (vehicle speed range (1)), evaporator temperature Teva falls in the period from t13 to t14 in response to increase in the compressor running rate, provided that evaporator temperature is above evaporator lower limit temperature Tlow. As the result, a cooling power of evaporator 11 can be prevented from falling leading up to time t14 when vehicle speed reaches Vacrec, and reduction of the effectiveness of the air conditioning in the compartment with the decrease of the compressor running rate can be prevented.

When the compressor running rate is controlled the same as in non-practice of the fuel cutoff in a vehicle speed range from the vehicle speed for starting deceleration fuel cutoff to Vst, the change of the evaporator temperature can found experimentally beforehand. Thus, vehicle speed Vst for increase authorization of compressor running rate is established adequately to be able to prevent a cooling power of evaporator to fall before time t14, when vehicle speed reaches Vacrec.

Next, timing charts according to one or more embodiments of the present disclosure is explained with reference to FIG. 3. In the vehicle speed range from the vehicle speed for starting deceleration fuel cutoff Vfc to vehicle speed Vst for increase authorization of compressor running rate, the compressor running rate is controlled the same as that in non-practice of the fuel cutoff. Therefore, the compressor running rate is increased more than in non-practice of the fuel cutoff from t11 to t12, and evaporator temperature falls in the period from t11 to t12. Evaporator temperature Teva rises after time t12 when increase of the compressor running rate is finished.

In the vehicle speed range from vehicle speed Vst for increase authorization of compressor running rate to Vacrec, evaporator temperature falls in the period from t13 to t14, due to increase in the compressor running rate, provided that evaporator temperature is above evaporator lower limit temperature Tlow.

In FIG. 3, a vehicle air-conditioner according to one or more embodiments of the present disclosure is different from the conventional device at least for the following reason. In the conventional device, the compressor running rate is increased more than in the non-practice of the fuel cutoff during the entire period from t1 to t4 (=t14). In one or more embodiments of the present disclosure, the compressor running rate is not increased in the period from t12, which is just before t13, to t13. Thus, Vst is set to achieve a period from t12 to t13 that prevents freezing of the evaporator 11.

Because predetermined time Tup in the conventional device is too long, increase of the compressor running rate becomes superabundant, causing the evaporator to freeze up in the conventional device. On the contrary, one or more embodiments of the present disclosure prevents freezing of evaporator 11 due to surplus or excessive increase of the compressor running rate.

When the compressor running rate is controlled the same as that in non-practice of the fuel cutoff during a vehicle speed range from the vehicle speed for starting deceleration fuel cutoff Vfc to Vst, the change of the evaporator temperature can be found experimentally beforehand. Thus, vehicle speed Vst for increase authorization of compressor running rate is decided adequately to stop increasing of the compressor running rate during some period before the vehicle speed reaches Vst.

Thus, the vehicle air conditioner according to one or more of the present disclosure comprises compression refrigerating cycle R including a compressor 1 that intakes, compresses, and discharges refrigerant, condenser 7 that condenses a high temperature and high pressure refrigerant discharged from compressor 1, expansion valve 10 that depressurizes the refrigerant which is condensed by condenser 7, evaporator 11 that performs heat exchange between open air and the low pressure refrigerant from expansion valve 10 which vaporizes the refrigerant, and control amplifier 51 (a compressor running rate control means). Control amplifier 51 can control the running rate of compressor 1, engine control module 5 (a deceleration fuel cutoff executing means and a fuel supply recovery executing means) which controls the deceleration fuel cutoff, cancel fuel cutoff and recover fuel supply at the timing of higher vehicle speed Vacrec in the condition of the deceleration fuel cutoff and air-conditioner ON than in condition of the deceleration fuel cutoff and air-conditioner OFF. Control amplifier 51 increases the compressor running rate more than during non-practice of the fuel cutoff (steps S1, S2, S3 and S5 of FIG. 4) in the predetermined period just before Vacrec, which is fuel recovery vehicle speed with air-condition ON during the deceleration fuel cutoff, and decrease the compressor running rate less than during non-practice of the fuel cutoff (steps S1, S2, S3, S6 and 8 of FIG. 4) at the vehicle speed of Vacrec, which is fuel recovery vehicle speed with air-condition ON.

As a result, regardless of the vehicle speed for starting deceleration fuel cutoff Vfc (the start time), a cooling power of evaporator 11 does not fall too far just before Vacrec, which corresponds to a fuel recovery vehicle speed, and reduction of the effectiveness of the air conditioning in the compartment associated with the fall of the compressor running rate can be prevented. Furthermore, evaporator 11 can be prevented from freezing up due to surplus increase of the compressor running rate. Moreover, evaporator 11 can be prevented from freezing due to an excessive increase of compressor running rate.

The evaporator temperature can fall too far, causing evaporator 11 to freeze, even when the vehicle speed is between Vacrec and Vst, if the compressor running rate is increased when the evaporator temperature is less than the evaporator lower limit temperature Tlow. In contrast, according to one or more embodiments of the present disclosure, the compressor running rate is increased more than in the non-practice of the fuel cutoff for the periods from Vst to Vacrec only when evaporator temperature is above evaporator lower limit temperature Tlow (see steps S4 and S5 of FIG. 4), and freezing of evaporator 11 in the predetermined period from Vst to Vacrec can be prevented.

Figure 5:
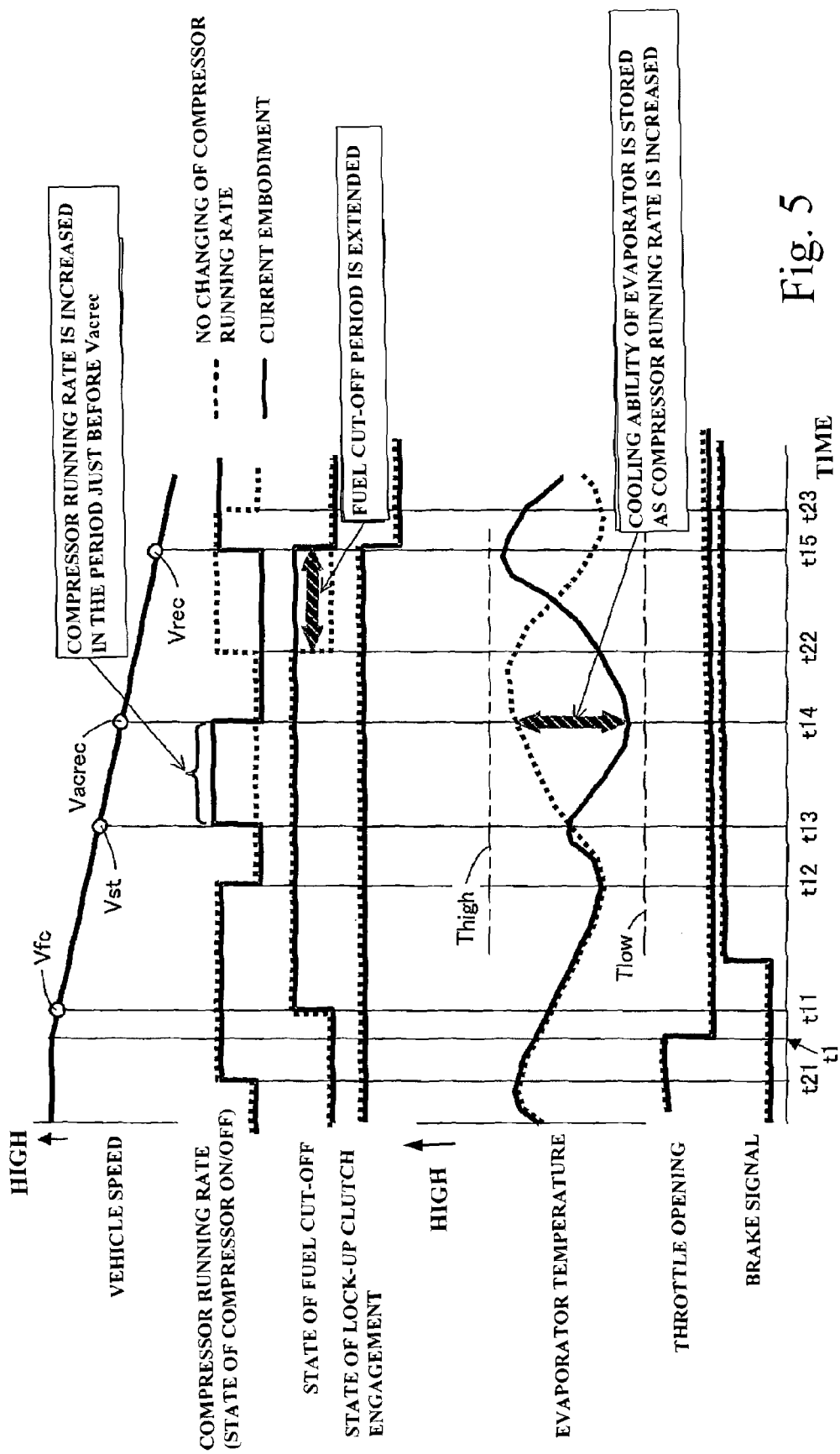
FIG. 5 shows timing charts showing each change such as vehicle speed in deceleration fuel cutoff, the compressor running rate, the evaporator temperature, etc.

The timing chart of FIG. 5 schematically shows how vehicle speed, compressor running rate, evaporator temperature, and other parameters change during deceleration fuel cutoff, in a comparable or similar fashion to FIG. 2 and FIG. 3. The broken lines show the changes in the parameters when the compressor running rate during the deceleration fuel cutoff is controlled similarly in non-practice of the fuel cutoff without adopting a conventional device (note that the dotted lines are identified as "no change of compressor running rate" in FIG. 5). When a conventional device is not adopted, increase and decrease of the compressor running rate are repeated regularly with an approximately constant period as shown in the broken line. More specifically, the compressor running rate increases from t21 to t12, decreases from t12 to t22, and increases from t22 to t23.

When the changes in the parameters according to one or more embodiments of the present disclosure, as shown in the solid lines, are compared to the device as shown in the broken lines, according to one or more embodiments of the present disclosure, Vst, which begins a period for increasing the compressor running rate, is set before Vacrec, which is vehicle speed for fuel supply recovery with air-conditioner ON (compressor running demand time), and is chosen adequately to be able to prevent evaporator 11 freezing immediately before Vacrec. Because much cooling power is saved at Vacrec without making evaporator 11 freeze, the period of decreasing compressor running rate (in other words, fuel cutoff overtime or extension) after Vacrec can be longer than that shown in the dotted lines (see the third timing chart from top in FIG. 5).

In one or more embodiments of the present disclosure, the compressor running rate is decreased less than in the non-practice of the fuel cutoff at the vehicle speed for fuel supply recovery in the air-conditioner ON Vacrec. However, this arrangement is not mandatory. For example, the compressor running rate may be decreased less than in the non-practice of the fuel cutoff just before vehicle speed for fuel supply recovery in the air-conditioner ON Vacrec.

Compressor 1 is not explained in detail above. One or more embodiments of the present disclosure can be applied to a compressor of the variable capacity or displacement type, or a compressor of the regulate or constant capacity type with an engagement controlled clutch. For example, when a compressor of the variable capacity type is used, the capacity duty ratios or duty cycle determining the compressor running rate is increased to a maximum of 100% in step S5 in FIG. 4, and the capacity duty ratio should be decreased to 0%, i.e., to the minimum, in step S8. Also, the capacity duty ratio is controlled in step S9 so that evaporator temperature becomes constant.

On the other hand, when a compressor of the fixed capacity type is used, a clutch is connected in step S5, and a compressor is turned ON, a clutch is separated or disengaged in step S8, and a compressor should be turned off. Also, the compressor is turned ON when the evaporator temperature is higher than the target temperature, and the compressor is turned OFF when the evaporator temperature is lower than the target temperature, in step S9.

In one or more embodiments of the present disclosure, higher limit temperature Thigh for prevention of air conditioning performance reduction is installed or provided in step S4 as a threshold, and lower limit temperature Tlow for prevention of evaporator freezing is installed in step S7 as a threshold. The evaporator temperature is controlled not to cross each threshold. This control is described under the assumption that a vehicle installed temperature sensor 52 is equipped for detecting evaporator temperature. However, one or more embodiments of the present disclosure may also be applicable to a vehicle controlling an evaporator temperature with a thermostat without having temperature sensor 52. In step S4, increase of the compressor running rate is canceled when the time period of increasing compressor running rate reaches the threshold. When a compressor ON command is missing from the thermostat in step S7, step S8 is selected. When there is a compressor ON command by the thermostat in step S7, step S9 is selected to cancel decrease of compressor running rate. Even if the vehicle does not have evaporator temperature sensor 52, freezing of the evaporator and reduction of the air conditioning performance during the deceleration fuel cutoff and air-conditioner ON can be prevented by using this control strategy.

According to one or more embodiments of the present invention, the fuel supply recovery time is defined by vehicle speed. This is envisaged because vehicle speed provides an accurate estimate as to whether an engine stall occurs. However, other parameters are also available with which whether an engine stall occurs can be judged. For example, the fuel supply recovery time may be measured or predicted based on a predetermined engine speed.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:
1. A vehicle air conditioner control system comprising:
an air conditioning device that performs a refrigerating cycle and comprising:
   a compressor that intakes, compresses, and discharges a refrigerant;
   a condenser that condenses the refrigerant discharged from the compressor;
   an expansion valve that depressurizes the refrigerant condensed by the condenser; and
   an evaporator that performs heat exchange between open air and the refrigerant to vaporize the refrigerant;
a compressor running rate control device that controls a running rate of the compressor;
a deceleration fuel cutoff executing device that performs cutoff of fuel supply during vehicle deceleration; and
a fuel supply recovery executing device that cancels cutoff of fuel supply and recovers fuel supply at a higher vehicle speed during vehicle deceleration fuel cutoff period with air- conditioner ON than during vehicle deceleration fuel cutoff period with air-conditioner OFF,
wherein the compressor running rate control device:
   increases the compressor running rate for a predetermined period starting at a predetermined time after the cutoff of fuel supply occurs but before a fuel supply recovery time with air-condition ON during the deceleration fuel cutoff period, and
   subsequently decreases the compressor running rate at or immediately before the
      fuel supply recovery time with air-condition ON until a fuel supply recovery time with the air-condition OFF during the deceleration fuel cutoff period.

2. The vehicle air conditioner control system of claim 1, wherein the predetermined period is set to prevent the evaporator from freezing at or immediately before the fuel supply recovery time.

3. The vehicle air conditioner control system as claimed in claim 1, wherein the compressor running rate control device increases the compressor running rate for the predetermined period more than during non-practice of the deceleration fuel cutoff only when a temperature of the evaporator is above a predetermined lower limit value.

4. The vehicle air conditioner control system as claimed in claim 1, wherein the compressor running rate control device decreases the compressor running rate at or immediately before the fuel supply recovery time with air-condition ON only when a temperature of the evaporator is below a predetermined upper limit value.

5. A vehicle air conditioner control system comprising:
an air conditioning device that performs a refrigerating cycle and comprising:
   a compressor that intakes, compresses, and discharges a refrigerant;
   a condenser that condenses the refrigerant discharged from the compressor;
   an expansion valve that depressurizes the refrigerant condensed by the condenser; and an evaporator that performs heat exchange between open air and the refrigerant to vaporize the refrigerant;

a compressor running rate control means for controlling a running rate of the compressor;

a deceleration fuel cutoff executing means for performing cutoff of fuel supply during vehicle deceleration; and a fuel supply recovery executing means for canceling cutoff of fuel supply and recovering fuel supply at a higher vehicle speed during vehicle deceleration fuel cutoff period with air-conditioner ON than during vehicle deceleration fuel cutoff period with air-conditioner OFF, wherein the compressor running rate control means:

increases the compressor running rate for a predetermined period starting at a predetermined time after the cutoff of fuel supply occurs but before a fuel supply recovery time with air-condition ON during the deceleration fuel cutoff period, and subsequently decreases the compressor running rate at or immediately before the fuel supply recovery time with air-condition ON until a fuel supply recovery time with the air-condition OFF during the deceleration fuel cutoff period.

6. The vehicle air conditioner control system of claim 5, wherein the predetermined period is set to prevent the evaporator from freezing at or immediately before the fuel supply recovery time.

7. The vehicle air conditioner control system as claimed in claim 5, wherein the compressor running rate control means increases the compressor running rate for the predetermined period more than during non-practice of the deceleration fuel cutoff only when a temperature of the evaporator is above a predetermined lower limit value.

8. The vehicle air conditioner control system as claimed in claim 5, wherein the compressor running rate control means decreases the compressor running rate at or immediately before the fuel supply recovery time with air-condition ON only when a temperature of the evaporator is below a predetermined upper limit value.

* * * * *